United States Patent
Wang et al.

(10) Patent No.: US 8,983,788 B2
(45) Date of Patent: Mar. 17, 2015

(54) SYSTEM AND METHOD OF MEASURING A SENSOR OFFSET

(75) Inventors: Wei D. Wang, Troy, MI (US); Steven E. Schulz, Torrance, CA (US); Jeffrey David, Milford, MI (US); Jackie L Cui, Torrance, CA (US); Andrew M. Zettel, Ann Arbor, MI (US); Hanne Buur, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 911 days.

(21) Appl. No.: 12/895,924

(22) Filed: Oct. 1, 2010

(65) Prior Publication Data

US 2012/0084039 A1 Apr. 5, 2012

(51) Int. Cl.
*G01D 18/00* (2006.01)
(52) U.S. Cl.
CPC .................................... *G01D 18/006* (2013.01)
USPC ................................ 702/104; 701/41; 701/42

(58) Field of Classification Search
USPC ................. 702/104; 318/782, 437, 474, 490; 701/41, 42
See application file for complete search history.

(56) References Cited

U.S. PATENT DOCUMENTS

| | | | | |
|---|---|---|---|---|
| 6,496,759 B1 * | 12/2002 | Mattes et al. | | 701/1 |
| 6,658,345 B2 * | 12/2003 | Miller | | 701/108 |
| 2003/0076060 A1 * | 4/2003 | Colosky et al. | | 318/254 |

* cited by examiner

*Primary Examiner* — Jonathan C Teixeira Moffat
*Assistant Examiner* — Hien Vo
(74) *Attorney, Agent, or Firm* — Quinn Law Group, PLLC

(57) ABSTRACT

A method includes detecting a first event and executing a first procedure to identify a sensor offset in response to detecting the first event. The method further includes determining, via a computing device, whether the sensor offset was measured during the execution of the first procedure, scheduling a second procedure to execute in response to detecting a second event if the sensor offset was not measured during the first procedure, and scheduling the first procedure to execute in response to detecting a subsequent occurrence of the first event if the sensor offset was measured during the first procedure.

16 Claims, 2 Drawing Sheets

SYSTEM AND METHOD OF MEASURING A SENSOR OFFSET

TECHNICAL FIELD

The invention relates to a system and method of measuring a sensor offset.

BACKGROUND

Passenger and commercial vehicles include various components that need to be calibrated. A number of circumstances can cause a false calibration reading or prevent the vehicle from properly calibrating the component. Without proper calibration, the vehicle may not operate properly. For example, when a component cannot be properly calibrated, the vehicle may go into a fail mode or a "limp home" mode. Both modes greatly affect the driving experience.

SUMMARY

A method includes detecting a first event, executing a first procedure to identify a sensor offset in response to detecting the first event, and determining, via a computing device, whether the sensor offset was measured during the execution of the first procedure. The method further includes scheduling a second procedure to execute in response to detecting a second event if the sensor offset was not measured during the first procedure, and scheduling the first procedure to execute in response to detecting a subsequent occurrence of the first event if the sensor offset was measured during the first procedure.

A system includes a motor configured to rotate in response to a control signal, a sensor configured to measure an angular position of the motor, and a control processor configured to execute a first procedure to measure a sensor offset. The control processor is further configured to determine whether the sensor offset was measured during the execution of the first procedure, and schedule at least one of the first procedure and a second procedure to execute based on whether the sensor offset was measured during the first procedure.

Another system includes a motor configured to rotate in response to a control signal, a sensor configured to measure an angular position of the motor, and a control processor configured to execute a first procedure to measure a sensor offset in response to a first event, determine whether the sensor offset was measured during the execution of the first procedure, and schedule at least one of the first procedure and a second procedure to execute based on whether the sensor offset was measured during the first procedure. The control processor is further configured to schedule the first procedure to execute in response to the first event if the control processor was able to measure the sensor offset during the first procedure. Moreover, the control processor is configured to schedule the second procedure to execute in response to a second event if the control processor failed to measure the sensor offset.

The system and method provided herein are, for example, able to calibrate a vehicle component despite circumstances that may prevent the system from otherwise doing so.

The above features and advantages and other features and advantages of the present invention are readily apparent from the following detailed description of the best modes for carrying out the invention when taken in connection with the accompanying drawings.

DETAILED DESCRIPTION

A system is provided that is able to calibrate a vehicle component despite circumstances that may prevent the system from otherwise doing so. The system includes a motor configured to rotate in response to a control signal and a sensor configured to measure an angular position of the motor. A control processor is configured to execute a first procedure to measure a sensor offset. The sensor offset may be determined from the difference between the position of the motor identified by the sensor and the actual position of the motor.

Certain circumstances may prevent the control processor from measuring the sensor offset. Some of these circumstances include a low voltage provided to the sensor, a high rotation speed of the sensor, or a low phase current provided to the sensor. As such, the control processor may be further configured to determine whether the sensor offset was measured during the execution of the first procedure. If so, the control processor may schedule the first procedure to execute at the next key-off event. If not, the control processor may schedule a second procedure to execute in response to the next key-on event. If the control processor is still unable to measure the sensor offset, then the control processor may set a fault code and/or take other remedial actions.

Figure 1:
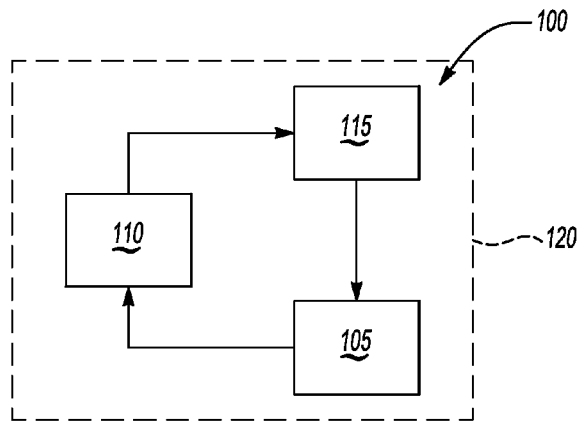
FIG. 1 is a schematic diagram of a system implemented in a vehicle.

FIG. 1 illustrates a system 100 that is able to calibrate a vehicle component despite circumstances that may cause false readings. The system 100 may take many different forms and include multiple and/or alternate components and facilities. While an example system 100 is shown in the Figures, the components illustrated in the Figures are not intended to be limiting. Indeed, additional or alternative components and/or implementations may be used.

The system 100 includes a motor 105, a sensor 110, and a control processor 115. In one implementation, the system 100 may be used in a vehicle 120, such as a passenger or commercial automobile. As such, the system 100 may be implemented in a hybrid electric vehicle including a plug-in hybrid electric vehicle (PHEV) or an extended range hybrid vehicle (EREV), a gas-powered vehicle, a battery electric vehicle (BEV), or the like. Of course, the system 100 may have other implementations besides use in a vehicle 120.

The motor 105 may include any device configured to generate a torque from electrical energy. For instance, in a hybrid vehicle, the motor 105 may receive electrical energy from a power source (not shown), such as a battery, or from an engine (not shown), such as an internal combustion engine. The motor 105 may be controlled by a control signal that controls, for example, the speed and direction at which the motor 105 rotates. The motor 105 may be used for various purposes in the vehicle 120. For instance, the motor 105 may be used to provide torque to a transmission (not shown) or to drive one or more clutch assemblies (not shown). As such, the vehicle 120 may have any number of motors 105. Of course, each motor 105 may have additional or other purposes within the vehicle 120.

The sensor 110 may include any device configured to measure the angular position of the motor 105. For example, the sensor 110 may include a resolver or an encoder. In one particular implementation, the sensor 110 may be configured to generate and output a position signal that represents the angular position of the motor 105. That is, the sensor 110 may measure the angular position of the motor 105 and output the position signal representative of the measured angular position. Any number of sensors 110 may be used. For instance, each motor 105 may have a corresponding sensor 110. Under some circumstances, the sensor 110 may be offset relative to the motor 105. That is, the signal output by the sensor 110 may not accurately represent the position of the motor 105.

The control processor 115 may include any device configured to receive the position signal from the sensor 110 and determine the angular position of the motor 105 based on the position signal. Moreover, the control processor 115 may be further configured to generate one or more control signals to control the operation of the motor 105. With the position signal and the control signals, the control processor 115 may be configured to measure the sensor offset. That is, the control processor 115 may be configured to determine a difference between the position measured by the sensor 110 and the actual position of the motor 105. The control processor 115 may use a first procedure 300 (see FIG. 3), a second procedure 400 (see FIG. 4), or both, when determining the sensor offset.

In one particular approach, the control processor 115 may be configured to determine the sensor offset in response to detecting an event. For instance, the control processor 115 may be configured to detect a key-off event, a key-on event, or both. The key-off event may include any situation where the driver intends to turn the vehicle 120 off. For example, the key-off event may include the driver of the vehicle 120 turning the key of the vehicle 120 to the "off" position. The key-on event may include any situation where the driver intends to turn the vehicle 120 on. For instance, the key-on position may include the driver turning the key to the "on" or "Run/Crank" position.

The control processor 115 may be further configured to execute either the first or second procedure 300, 400 based on the type of the event detected. In one particular approach, the control processor 115 may be configured to execute the first procedure 300 in response to the key-off event and/or execute the second procedure 400 in response to the key-on event. As discussed above, certain circumstances may interfere with the ability of the control processor 115 to measure the sensor offset. Some of these circumstances include a low voltage provided to the sensor 110, a high rotation speed of the motor 105, or a low phase current provided to the sensor 110. Under these and other circumstances, the control processor 115 may not be able to accurately measure the sensor offset. Accordingly, if the control processor 115 was not able to measure the sensor offset during the first procedure 300 executed at the key-off event, the control processor 115 may be configured to schedule the second procedure 400 to be executed at the next key-on event.

Once the sensor offset has been measured, the control processor 115 may be configured to determine whether the measured sensor offset is within a predetermined range. That is, the control processor 115 may be configured to compare the sensor offset to a predetermined range of acceptable sensor offsets. If the sensor offset indicates that the sensor 110 is operating outside the predetermined range, the control processor 115 may be configured to indicate that the sensor 110 has failed or that the measured sensor offset is unreliable, and that the vehicle 120 should be serviced. If, however, the control processor 115 determines that the sensor offset is within the predetermined range, the control processor 115 may accept the measured sensor offset as the offset value and store the offset value in a memory device (not shown).

The control processor 115 may further be configured to schedule the first procedure 300, the second procedure 400, or both, based on the measured sensor offset relative to the predetermined range. For instance, the control processor 115 may be configured to schedule the first procedure 300 to execute in response to a key-off event if the sensor offset is within the predetermined range. Additionally, the control processor 115 may be configured to schedule the second procedure 400 to execute in response to a key-on event if the sensor offset is outside the predetermined range.

If the control processor 115 is unable to measure the sensor offset, the control processor 115 may be configured to determine whether further attempts to measure the sensor offset should be made. For instance, the control processor 115 may be configured to count the number of previous attempts and compare the number of previous attempts to a predetermined limit of allowed attempts. If the number of previous attempts is below the predetermined limit, the control processor 115 may be configured to instruct the sensor 110 to make further attempts to measure the position of the motor 105. If, however, the predetermined limit is met or exceeded, the control processor 115 may be configured to take a remedial action as discussed in greater detail below.

In addition to the number of attempts, the control processor 115 may include a timer configured to monitor an amount of time that has elapsed since the control processor 115 detected either the key-on or key-off event. Accordingly, the elapsed time may represent the amount of time taken by the control processor 115 to measure the sensor offset. The control processor 115 may be configured to compare the amount of time taken to measure the sensor offset to a predetermined value representing an allowed amount of time. If the amount of time measured is below the predetermined value, the control processor 115 may be configured to make further attempts to measure the sensor offset. If, however, the amount of time exceeds the predetermined value, the control processor 115 may be configured to stop attempting to measure the sensor offset and instead take a remedial action. The timer may be part of the control processor 115, or alternatively, may be a separate computing device than the control processor 115.

The control processor 115 may be configured to take various remedial actions if the control processor 115 is unable to measure the sensor offset. For instance, the control processor 115 may be configured to set a fault code. One example fault code may place the vehicle 120 into a "limp home" mode, which allows the vehicle 120 to operate at a reduced capacity, such as at slower speeds. Another example fault code may place the vehicle 120 into a "fail" mode, which indicates that the vehicle 120 is not drivable and must be serviced immediately. In any instance, setting the fault code may cause a warning light on the dashboard of the vehicle 120 to illuminate. The warning light may indicate to the driver of the vehicle 120 that service is needed as soon as possible.

In general, computing systems and/or devices, such as the control processor 115, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
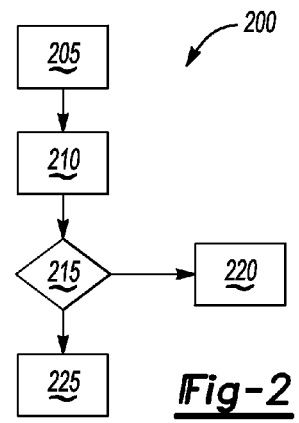
FIG. 2 is a flowchart of a process that may be implemented by the system of FIG. 1.

FIG. 2 illustrates a process 200 that may be implemented by the system 100 of FIG. 1.

At block 205, the system 100 detects the key-off event. For instance, the control processor 115 may detect the key-off event. As discussed above, the key-off event may include any situation where the driver intends to shut the vehicle 120 off. For instance, the driver of the vehicle 120 may turn the key to the "off" position.

At block 210, the system 100 executes the first procedure 300. In one particular approach, the control processor 115 executes the first procedure 300 in response to detecting the key-off event. An example first procedure 300 is discussed in greater detail below with respect to FIG. 3.

At decision block 215, the system 100 determines whether the sensor offset was measured during the first procedure 300. For instance, the control processor 115 may determine whether it was able to identify the sensor offset. If so, the process 200 may continue at block 220. If not, the process 200 may continue at block 225.

At block 220, the system 100 may schedule the first procedure 300 to execute in response to detecting a subsequent occurrence of the key-off event. For example, the control processor 115 may schedule the first procedure 300 to execute the next time the driver turns the key to the "off" position.

At block 225, the system 100 may schedule the second procedure 400 to execute in response to detecting the key-on event. For instance, the control processor 115 may schedule the second procedure 400 to execute the next time the driver turns the key to the "on" position. The second procedure 400 is discussed below in greater detail with respect to FIG. 4.

Figure 3:
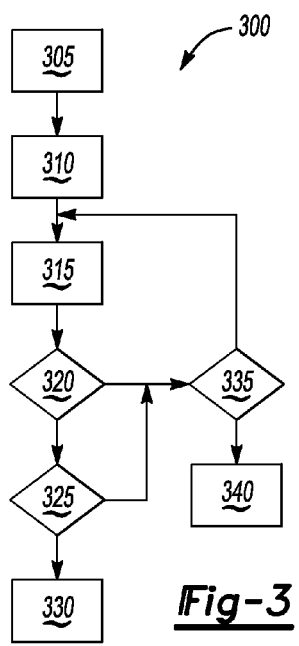
FIG. 3 is a flowchart of a first procedure that may be executed by the system of FIG. 1.

FIG. 3 is a flowchart of an example first procedure 300 that may be implemented by the system 100 of FIG. 1.

At block 305, the system 100 detects the key-off event. For instance, the control processor 115 may determine that the driver turning the key to the "off" position is the key-off event. This way, the first procedure 300 may be executed in response to the key-off event.

At block 310, the system 100 starts a timer. The timer may be used to count the amount of time that has elapsed since detecting the key-off event. The timer may be implemented by the control processor 115, or alternatively, may be implemented as a separate computing device (not shown).

At block 315, the system 100 may measure the sensor offset. That is, in one implementation, the control processor 115 may determine that the sensor offset is the difference between the position of the motor 105 indicated by the sensor 110 via the position signal and the position of the motor 105 indicated by the control signal.

At decision block 320, the system 100 may determine whether the sensor offset was measured. For example, as discussed above, certain circumstances may interfere with the ability of the control processor 115 to measure the sensor offset. For instance, a low voltage provided to the sensor 110, a high rotation speed of the motor 105, or a low phase current provided to the sensor 110 may prevent the control processor 115 from measuring the sensor offset. Accordingly, the control processor 115 may determine whether it was able to successfully measure the sensor offset at block 315. If the control processor 115 was able to measure the sensor offset, the process 300 may continue at decision block 325. If the control processor 115 was unable to measure the sensor offset, the process 300 may continue at decision block 335.

Figure 5:
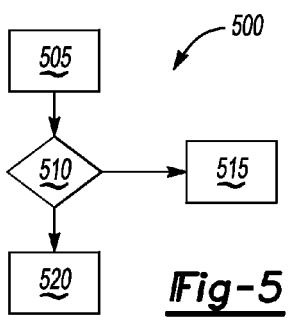
FIG. 5 is a flowchart of an out of range procedure that may be executed during the procedures of FIGS. 3 and 4.

At decision block 325, the system 100 may determine whether the sensor offset is out of range. That is, the control processor 115 may compare the measured sensor offset to a predetermined range of acceptable sensor offsets. One possible procedure for determining whether the sensor offset is within the predetermined range is illustrated in FIG. 5. If the control processor 115 determines that the sensor offset is within the predetermined range, the process 300 continues at block 330. If the control processor 115 determines that the sensor offset is outside the predetermined range, the process 300 continues at decision block 335.

At block 330, the system 100 may set the sensor offset to the measured value. In one particular approach, the control processor 115 may store the measured sensor offset as a value in a memory device (not shown). The control processor 115 may further clear the timer that was started at block 310.

Figure 6:
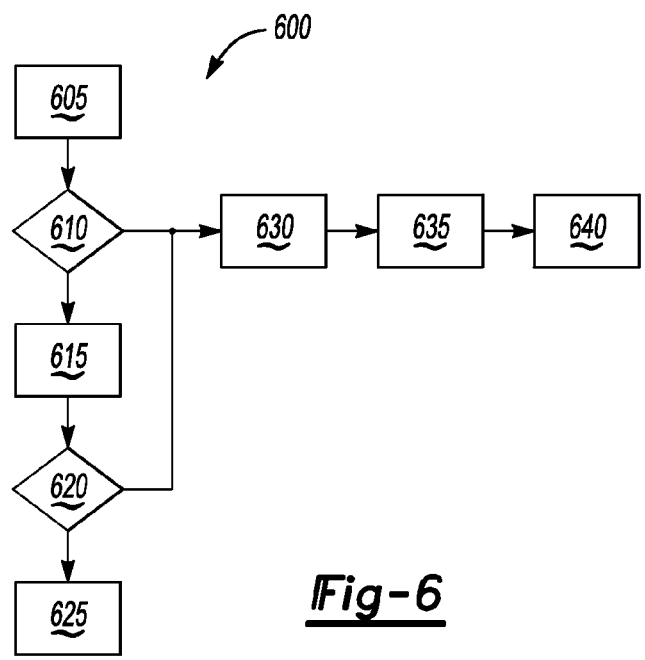
FIG. 6 is a flowchart of a retry procedure that may be executed during the procedures of FIGS. 3 and 4.

At decision block 335, the system 100 may determine whether to continue to attempt to measure the sensor offset. For instance, the control processor 115 may use the number of previous attempts and the elapsed time to determine whether to continue to attempt to determine the sensor offset. One possible procedure for determining whether to continue to attempt to determine the sensor offset is illustrated in FIG. 6. If the control processor 115 determines that it should continue to attempt to measure the sensor offset, the process 300 may continue at block 315. If, however, the control processor 115 determines that it should not continue to attempt to measure the sensor offset, the process 300 may continue at block 340.

At block 340, the system 100 may set a key-on flag. In one particular approach, the control processor 115 may set the key-on flag, which may indicate that the second procedure 400 should be executed at the next key-on event. The second procedure 400 is discussed in greater detail below with respect to FIG. 4.

Figure 4:
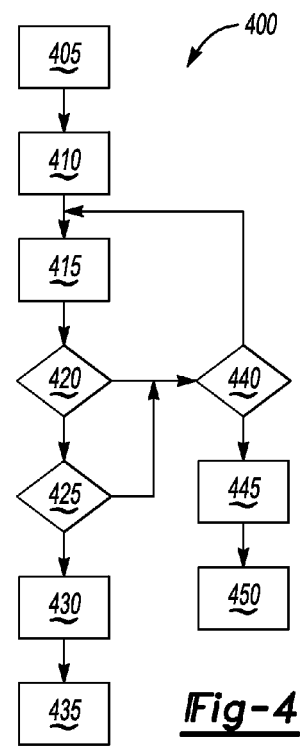
FIG. 4 is a flowchart of a second procedure that may be executed by the system of FIG. 1.

FIG. 4 illustrates a flowchart of an example first procedure 400 that may be implemented by the system 100 of FIG. 1.

At block 405, the system 100 may detect the event, such as the key-on event. For instance, the control processor 115 may be configured to identify an instance where the driver turns the key to the "on" position and interpret such instance as the key-on event. Therefore, contrary to the first procedure 300, which is executed in response to the key-off event, the second procedure 400 may be executed in response to the key-on event.

At block 410, the system 100 may start the timer. The timer may be used to count the amount of time that has elapsed since detecting the event. The timer may be part of the control processor 115, or alternatively, may be implemented as a separate computing device (not shown).

At block 415, the system 100 may measure the sensor offset. That is, in one particular approach, the control processor 115 may identify the sensor offset as the difference between the position of the motor 105 indicated by the sensor 110 via the position signal and the position of the motor 105 indicated by the control signal.

At decision block 420, the system 100 may determine whether the sensor offset was measured. For instance, certain circumstances may interfere with the ability of the control processor 115 to measure the sensor offset. Indeed, the second procedure 400 may be executed because the control processor 115 was unable to measure the sensor offset during the execution of the first procedure 300. Accordingly, the control processor 115 may determine whether it was able to successfully measure the sensor offset at block 415. If the control processor 115 is able to measure the sensor offset, the process 400 may continue at decision block 425. If not, the process 400 may continue at decision block 440.

At decision block 425, the system 100 may determine whether the sensor offset is out of range. That is, the control processor 115 may compare the measured sensor offset to a predetermined range of acceptable sensor offsets. One example procedure for determining whether the sensor offset is within the predetermined range is illustrated in FIG. 5. If the control processor 115 determines that the sensor offset is within the predetermined range, the process 400 may continue at block 430. If not, the process 400 may continue at decision block 440.

At block 430, the system 100 may set the sensor offset to the measured value. In one particular approach, the control processor 115 may store the measured sensor offset as a value in a memory device (not shown). The control processor 115 may further clear the timer that was started at block 410.

At block 435, the system 100 may set a key-off flag. For instance, the control processor 115 may set the key-off flag, which may indicate that the first procedure 300 should be executed in response to the key-off event. The first procedure 300 was discussed in greater detail above with respect to FIG. 3.

At decision block 440, the system 100 may determine whether to continue to attempt to measure the sensor offset. For instance, the control processor 115 may use the number of previous attempts and the elapsed time to determine whether to continue to attempt to determine the sensor offset. One example procedure to determine whether to continue to attempt to determine the sensor offset is illustrated in FIG. 6, below. If the control processor 115 determines that further attempts are warranted, the process 400 may continue at block 415. If, however, the control processor 115 determines that it should not continue to attempt to measure the sensor offset, the process 400 may continue at block 445.

At block 445, the system 100 may set a fault code or take some other remedial action. In one possible approach, the control processor 115 may set the fault code. One example fault code may place the vehicle 120 into a "limp home" mode, which allows the vehicle 120 to operate at a reduced capacity, such as at slower speeds. Another example fault code may place the vehicle 120 into a "fail" mode, which indicates that the vehicle 120 is not drivable and must be serviced immediately. In any instance, setting the fault code may cause a warning light on the dashboard (not shown) of the vehicle 120 to illuminate. The warning light may indicate to the driver that service is needed as soon as possible.

At block 450, the system 100 may use a previously measured sensor offset as the current sensor offset. For instance, the control processor 115 may access a memory device for the previously calculated sensor offset to use until a new sensor offset can be measured.

FIG. 5 is a flowchart of an example process 500 that may be implemented by the system 100 to determine whether the system 100 offset is out of a particular range.

At block 505, the system 100 may receive the sensor offset value determined by, for example, the control processor 115 at block 315 of FIG. 3 or at block 415 of FIG. 4.

At decision block 510, the system 100 may determine whether the received sensor offset value is within the predefined range of acceptable sensor offset values. That is, the control processor 115 may compare the received sensor offset value and compare the received sensor offset value with the predetermined range of acceptable sensor offset values. If the received sensor offset value is within the predetermined range, the process 500 may continue at block 515. If the received sensor offset value is outside the predetermined range, the process 500 may continue at block 520.

At block 515, the system 100 may direct the process 500 to continue with either the first or second procedure 300, 400 so that the received sensor offset value can be set as the sensor offset. As such, block 515 may cause the process 500 to go to block 330 of FIG. 3 or at block 430 of FIG. 4.

At block 520, the system 100 may direct the process 500 to continue with either the first or second procedure 300, 400 so that the system 100 can determine whether to continue to make further attempts to determine the sensor offset. For instance, block 520 may cause the process 500 to go to block 335 of FIG. 3 or block 440 of FIG. 4.

FIG. 6 illustrates an exemplary process 600 of determining whether to make further attempts to measure the sensor offset. For instance, the process 600 may be used following a failed attempt to measure the sensor offset, as indicated in the first or second procedure 300, 400.

At block 605, the system 100 may determine the number of previous attempts. For instance, the control processor 115 may count the number of previous attempts and store the number of previous attempts in a memory device.

At decision block 610, the system 100 may determine whether additional attempts may be made. For instance, the control processor 115 may compare the number of previous attempts to the predetermined number of allowed attempts. If the number of previous attempts is below the predetermined number of allowed attempts, the process 600 may continue at block 615. If, however, the number of previous attempts is at or above the predetermined number of allowed attempts, the process 600 may continue at block 630.

At block 615, the system 100 may check the timer. For instance, the control processor 115 may determine the amount of time that has elapsed during the first or second procedure 300, 400 by checking the timer started at block 310 of FIG. 3 or block 410 of FIG. 4.

At decision block 620, the system 100 may determine whether the predetermined amount of time has elapsed. For instance, the control processor 115 may compare the amount of time that has elapsed (i.e., the amount of time recorded by the timer) to the predetermined amount of time allowed. If the elapsed time is below the predetermined amount of time allowed, the process 600 may continue at block 625. If, however, the elapsed time is at or greater than the predetermined amount of allowed time, the process 600 may continue at block 630.

At block 625, the system 100 may determine that further attempts to measure the sensor offset are permitted. For instance, the control processor 115 may determine that further attempts are permitted and continue the first procedure 300 at block 315 of FIG. 3 or the second procedure 400 at block 415 of FIG. 4.

At block 630, the system 100 may clear the number of previous attempts. For example, the control processor 115 may clear the number of previous attempts from the memory device so that subsequent attempts to measure the sensor offset will not count toward the predetermined number of allowed attempts.

At block 635, the system 100 may clear the timer. For instance, the control processor 115 may clear the timer so that the elapsed time to measure the sensor offset during the first or second procedure 300, 400 will not count toward the predetermined amount of time allowed.

At block 640, the system 100 may direct the process 600 to continue with the first procedure 300 at block 340 of FIG. 3 or at block 445 of FIG. 4.

Figure 7:
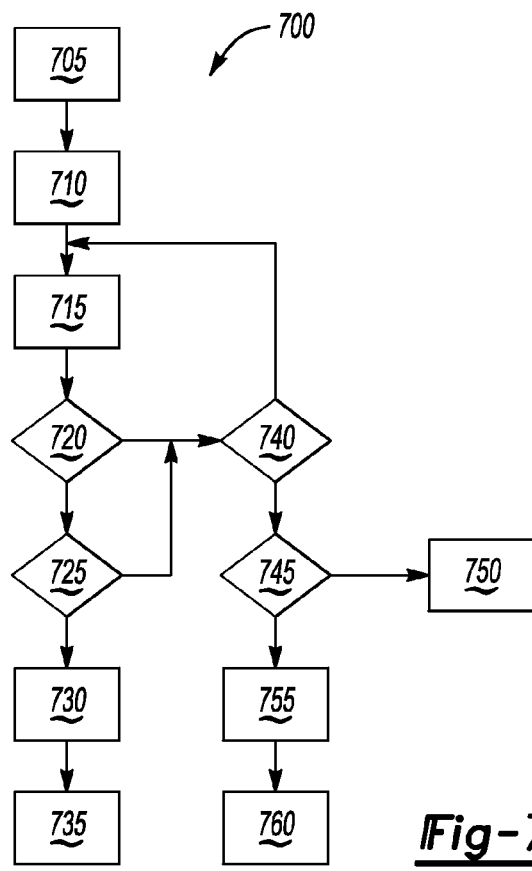
FIG. 7 is a flowchart of another process that may be implemented by the system of FIG. 1.

FIG. 7 illustrates another sample process 700 that may be implemented by the system 100 of FIG. 1. For instance, the process 700 may be implemented as an alternative to the first and second procedure 400s.

At block 705, the system 100 may detect an event. For instance, the control processor 115 may detect either the key-off event or the key-on event.

At block 710, the system 100 may start the timer. For instance, the control processor 115 may start the timer to count the amount of time that has elapsed since detecting the event. As discussed in FIG. 6, the elapsed time may be used to determine whether to make further attempts to measure the sensor offset. The timer may be part of the control processor 115, or alternatively, may be implemented as a separate computing device (not shown).

At block 715, the system 100 may measure the sensor offset. In one particular approach, the control processor 115 may identify the sensor offset as the difference between the position of the motor 105 indicated by the sensor 110 via the position signal and the position of the motor 105 indicated by the control signal.

At decision block 720, the system 100 may determine whether the sensor offset was measured. As previously discussed, several circumstances may interfere with the ability of the control processor 115 to measure the sensor offset. Accordingly, the control processor 115 may determine whether it was able to successfully measure the sensor offset at block 715. If the control processor 115 is able to measure the sensor offset, the process 700 may continue at decision block 725. If the control processor 115 fails to measure the sensor offset, the process 700 may continue at decision block 740.

At decision block 725, the system 100 may determine whether the measured sensor offset is out of range. That is, the control processor 115 may compare the measured sensor offset to a predetermined range of acceptable sensor offsets. One example procedure for determining whether the sensor offset is within the predetermined range is discussed above with respect to FIG. 5. If the control processor 115 determines that the sensor offset is within the predetermined range, the process 700 may continue at block 730. If not, the process 700 may continue at decision block 740.

At block 730, the system 100 may set the sensor offset to the measured value. In one particular approach, the control processor 115 may store the measured sensor offset as a value in a memory device (not shown). The control processor 115 may further clear the timer that was started at block 710.

At block 735, the system 100 may set the key-off flag. That is, the control processor 115 may set the key-off flag that schedules the process 700 to begin again at the next key-off event.

At block 740, the system 100 may determine whether to make further attempts to measure the sensor offset. For instance, the control processor 115 may use the process 600 described with reference to FIG. 6 to determine whether further attempts to measure the sensor offset should be made. If so, the process 700 may continue at block 715. If not, the process 700 may continue at decision block 745.

At decision block 745, the system 100 may determine what type of event triggered the process 700. For instance, the control processor 115 may determine whether a key-off event or a key-on event triggered the process 700 to begin. If a key-off event, the process 700 may continue at block 750. If a key-on event triggered the process 700, the process 700 may continue at block 755.

At decision block 750, the system 100 may set the key-on flag. That is, the control processor 115 may set the key-on flag, which schedules the process 700 to begin again at the next key-on event.

At decision block 755, the system 100 may set a fault code or take some other remedial action. In one possible approach, the control processor 115 may set the fault code. One example fault code may place the vehicle 120 into a "limp home" mode, which allows the vehicle 120 to operate at a reduced capacity, such as at slower speeds. Another example fault code may place the vehicle 120 into a "fail" mode, which indicates that the vehicle 120 is not drivable and must be serviced immediately. In any instance, setting the fault code may cause a warning light on the dashboard of the vehicle 120 to illuminate. The warning light may indicate to the driver that service is needed as soon as possible.

At block 760, the system 100 may use a previously measured sensor offset as the current sensor offset. For instance, the control processor 115 may access a memory device for the previously calculated sensor offset to use until a new sensor offset can be measured.

While the best modes for carrying out the invention have been described in detail, those familiar with the art to which this invention relates will recognize various alternative designs and embodiments for practicing the invention within the scope of the appended claims.

The invention claimed is:

1. A method comprising:
   detecting a first key event in a vehicle, wherein the first key event is one of a key-on and a key-off event;
   executing a first procedure to measure a sensor offset of a sensor in response to detecting the first key event, wherein the sensor offset is calculated as a difference between a first position indicated by the sensor and a second position indicated by a control signal for controlling a position of a device monitored by the sensor;
   determining, via a computing device, whether the sensor offset was measured during the execution of the first procedure;
   executing, via the computing device, a second procedure in response to detecting a second key event in the vehicle if the sensor offset was not measured during the first procedure, wherein the second procedure includes measuring the sensor offset; and
   scheduling, via the computing device, the first procedure to execute in response to detecting a subsequent occurrence of the first key event if the sensor offset was measured during the first procedure;

wherein the first key event and the second key event are different ones of a key-on event and a key-off event of the vehicle.

2. A method as set forth in claim 1, wherein the second procedure includes determining whether the computing device measured the sensor offset.

3. A method as set forth in claim 2, wherein at least one of the first procedure and the second procedure includes determining whether the measured sensor offset is within a predetermined range.

4. A method as set forth in claim 3, wherein scheduling the second procedure to execute in response to detecting the second key event includes scheduling the second procedure to execute in response to detecting the second key event if the measured sensor offset is outside the predetermined range.

5. A method as set forth in claim 3, wherein scheduling the first procedure to execute in response to detecting the first key event includes scheduling the first procedure to execute in response to detecting the first key event if the measured sensor offset is within the predetermined range.

6. A method as set forth in claim 2, wherein the second procedure includes setting a fault code if the control processor failed to measure the sensor offset.

7. A method as set forth in claim 2, wherein the second procedure includes taking a remedial action if the control processor failed to measure the sensor offset.

8. A system for a vehicle, comprising:
a motor configured to rotate in response to a control signal;
a sensor configured to measure an angular position of the motor; and
a control processor configured to:
detect a key event of a vehicle, wherein the key event is one of a key-on event and a key-off event;
execute, in response to the detected key event, a first procedure to measure a sensor offset of the sensor, the sensor offset calculated as a difference between the angular position of the motor indicated by the sensor and an angular position of the motor indicated by the control signal, determine whether the sensor offset was measured during the execution of the first procedure, to determine whether the sensor offset is within a predetermined range, and schedule execution of at least one of the first procedure and a second procedure in response to the key event if the sensor offset is outside the predetermined range, and the first procedure in response to the key event if the sensor offset is within the predetermined range, wherein the control processor is configured to execute the second procedure to measure the sensor offset if the control processor fails to execute a measurement of the sensor offset during the execution of the first procedure.

9. A system as set forth in claim 8, wherein the control processor is configured to determine whether the sensor offset is within a predetermined range.

10. A system as set forth in claim 9, wherein the control processor is configured to schedule the second procedure to execute in response to the key-on event if the measured sensor offset is outside the predetermined range.

11. A system as set forth in claim 9, wherein the control processor is configured to schedule the first procedure to execute in response to the key-off event if the sensor offset is within the predetermined range.

12. A system as set forth in claim 8, wherein the control processor is configured to set a fault code if the control processor failed to execute measurement of the sensor offset.

13. A system as set forth in claim 8, wherein the control processor is configured to take a remedial action if the control processor failed to execute measurement of the sensor offset.

14. A system as set forth in claim 8, wherein the control processor is configured to schedule the first procedure to execute in response to the key-off event if the control processor was able to execute measurement of the sensor offset.

15. A system as set forth in claim 8, wherein the control processor is configured to schedule the second procedure to execute in response to the key-on event if the control processor failed to execute measurement of the sensor offset.

16. A system for a vehicle, the system comprising:
a motor configured to rotate in response to a control signal;
a sensor configured to measure an angular position of the motor; and
a control processor in communication with the sensor, and configured to execute a first procedure to measure a sensor offset as a difference between the measured angular position and an actual angular position of the motor in response to a key-off event of the vehicle, determine whether the sensor offset was measured during the execution of the first procedure, schedule the first procedure to execute in response to a subsequent occurrence of the key-off event if the sensor offset is within a predetermined range, and schedule the second procedure to execute in response to a next key-on event if the measured sensor offset is outside the predetermined range.

* * * * *